(12) United States Patent
Lee et al.

(10) Patent No.: US 7,609,675 B2
(45) Date of Patent: Oct. 27, 2009

(54) METHOD AND SYSTEM FOR RECOGNIZING CALL SWITCH-OVER FROM 1XEV-DO SYSTEM TO 1X SYSTEM

(75) Inventors: Jaemoon Lee, Seoul (KR); Jintae Choi, Seoul (KR); Beyongsu Kim, Seoul (KR); Namgyu Kim, Uiwang-si (KR)

(73) Assignee: SK Telecom Co., Ltd., Seoul (KR)

( * ) Notice: Subject to any disclaimer, the term of this patent is extended or adjusted under 35 U.S.C. 154(b) by 212 days.

(21) Appl. No.: 10/541,241

(22) PCT Filed: Dec. 12, 2003

(86) PCT No.: PCT/KR03/02722

§ 371 (c)(1),
(2), (4) Date: Feb. 28, 2006

(87) PCT Pub. No.: WO2004/059887

PCT Pub. Date: Jul. 15, 2004

(65) Prior Publication Data

US 2006/0153134 A1 Jul. 13, 2006

(30) Foreign Application Priority Data

Dec. 30, 2002 (KR) .................. 10-2002-0087438
Aug. 4, 2003 (KR) .................. 10-2003-0053895

(51) Int. Cl.
*H04B 7/212* (2006.01)
(52) U.S. Cl. .................. 370/331; 370/332; 370/328; 370/338
(58) Field of Classification Search .................. 370/331, 370/332, 328, 338; 455/436, 426.1, 438
See application file for complete search history.

(56) References Cited

U.S. PATENT DOCUMENTS

2003/0152049 A1* 8/2003 Turner .................. 370/331

FOREIGN PATENT DOCUMENTS

| JP | 2002-171572 | 6/2002 |
| KR | 2002-0002204 | 1/2002 |
| KR | 2003-0035040 | 5/2003 |
| KR | 2003-0050864 | 6/2003 |

OTHER PUBLICATIONS

International Search Report for Application No. PCT/KR2003/002722, dated Mar. 9, 2004.

* cited by examiner

*Primary Examiner*—Lester Kincaid
*Assistant Examiner*—Sayed T Zewari
(74) *Attorney, Agent, or Firm*—Lowe Hauptman Ham & Berner, LLP (57) ABSTRACT

The system in accordance with the present invention recognizes in real time that a call connection of a hybrid access terminal be switched over to a 1X system, by sending an inquiry message inquiring the hybrid access terminal of whether the hybrid access terminal has received voice signal or a low-rate data signal and by receiving a confirmation message that the hybrid access terminal has received the voice signal or the low-rate data signal from a mobile switching center, if a low-level signal below a prescribed level is received from the hybrid access terminal while counting time initiated from a point of a call drop while the hybrid access terminal is being provided with a multimedia service.

26 Claims, 6 Drawing Sheets

METHOD AND SYSTEM FOR RECOGNIZING CALL SWITCH-OVER FROM 1XEV-DO SYSTEM TO 1X SYSTEM

FIELD OF THE INVENTION

The present invention relates to a method and a system for recognizing call switch-over of a hybrid access terminal from a 1xEV-DO mode to a 1X mode, and more particularly to a method and a system for recognizing automatic call switch-over of a hybrid access terminal from a 1xEV-DO mode to a 1X mode, if call drop occurs while multimedia data are being transmitted from a 1xEV-DO system to the hybrid access terminal so that the hybrid access terminal is connected to the 1X system based on voice signals transmitted from the 1X system.

BACKGROUND OF THE INVENTION

Mobile communication systems have been greatly advanced through first generation analog-type advanced mobile phone systems (AMPS) and second generation cellular/personal communication service (PCS) systems. Recently, international mobile telecommunication-2000 (IMT-2000) systems have been developed and are widely used as third generation high-rate data communication systems.

IMT 2000 services may be classified into a Code Division Multiple Access (hereinafter, referred to as a CDMA) 2000 1X services and CDMA 2000 1x EV-DO services.

The CDMA 2000 1X service enables a wireless Internet to be provided at a speed of 144 kbps at maximum, which is far faster than a speed of 14.4 kbps or 56 kbps supported by the existing IS-95A/B networks, by means of IS-95C network upgraded from the IS-95A/B networks. Accordingly, the service quality of the existing voice and Wireless Application Protocol (WAP) can be improved through the CDMA 2000 1x service. In addition, various multimedia services (e.g., AOD, VOD) can be provided.

The 3GPP2 ($3^{rd}$ Generation Partnership Project2), which is a collaborative international standardization group, offers standards for a CDMA IMT-2000 system as IMT-2000 standards in order to provide multimedia mobile communication services. According to the above standards, a high rate packet data system called "CDMA 2000 1x EV-DO (evolution data optimized)" based on an HDR (high data rate) proposed by Qualcom Incorporated, has been decided upon as an international standard high rate packet data system. A CDMA 2000 1xEV-DO (hereinafter, referred to as '1xEV-DO') system has been upgraded from a CDMA 2000 1X system and is designed to transmit only data.

The 1X system utilizes both circuit networks and packet networks and provides single directional low-rate data services with a maximum transmission rate of 307.2 Kbps as well as voice data. In contrast, the 1xEV-DO system is dedicated for a packet network and provides bi-directional high-rate data services with a maximum transmission rate of 2.4 Mbps.

In the following description, the CDMA 2000 1X system is simply referred to as "1X system" and the CDMA 2000 1xEV-DO system is simply referred to as "1xEV-DO system" for the convenience of explanation.

Currently, the 1xEV-DO system has been used together with the conventional 1X system. That is, both of the 1xEV-DO system and the conventional 1X system are installed in one wireless base station or a base station controller even though they are operated separately from each other. In other words, a transceiver of the wireless base station includes a channel card for the 1xEV-DO system and a channel card for the 1X system, respectively. In addition, the base station controller includes a data processing board for processing packet data transmitted/received through a 1xEV-DO system and another data processing board for processing data transmitted/received through a 1X system, respectively.

When high-rate data (i.e., multimedia data) are transmitted to a mobile communication terminal from a mobile communication system, such as the wireless base station or the base station controller, the data are transmitted through the 1xEV-DO system. In addition, voice signals or low-rate data are transmitted through the 1X system.

A hybrid access terminal is a mobile communication terminal capable of receiving communication services transmitted from both the 1xEV-DO system and the 1X system. Further, the hybrid access terminal may periodically and alternately monitor each of the 1xEV-DO and 1X systems in a predetermined period of time. That is, in a 1X mode in which the 1xEV-DO system is not used, the hybrid access terminal making communication with the 1X system periodically searches the 1xEV-DO system. Further, when the hybrid access terminal is in traffic with the 1xEV-DO system, the hybrid access terminal periodically searches the 1X system while making communication with the 1xEV-DO system.

For instance, the hybrid access terminal in traffic with the 1xEV-DO system responds to call signals, such as voice call-accepted signals and short messages, which may be transmitted to the hybrid access terminal from the 1X system. Further, the hybrid access terminal periodically accesses to the 1X system to register its own position to the 1X system, receives overhead messages such as system parameter messages and access messages and updates system resources.

However, the hybrid access terminal must stay in the 1X system until the system resources have been completely updated whenever the hybrid access terminal periodically accesses to the 1X system even if the hybrid access terminal is in traffic with the 1xEV-DO system.

In addition, the 1xEV-DO system may perform a call drop operation if a signal having a level below a predetermined level is received from the hybrid access terminal through a data rate control (DRC) channel when the hybrid access terminal is in traffic with the 1xEV-DO system for a predetermined period of time (designated as a parameter in the system). That is, regardless of reasons thereof, if the signal having the level below the predetermined level are received through a reverse channel for a predetermined period of time, the 1xEV-DO system performs the call drop operation with respect to the hybrid access terminal in order to efficiently utilize the system resources.

However, currently used 1xEV-DO systems have structures which do not provide a user with reasons for the call drop operation. In other words, the 1xEV-DO system does not provide the user with information allowing the user to find a precise reason for the call drop operation, even though the call drop operation may happen in various situations, such as when the hybrid access terminal making a call-connection with the 1xEV-DO system is shifted into a wave shadow zone, when a communication system malfunctions, or when the hybrid access terminal is switched into the 1X system.

SUMMARY OF THE INVENTION

Therefore, the present invention has been made in view of the above-mentioned problems, and it is an object of the present invention to provide a method and a system for recognizing automatic call switch-over of a hybrid access terminal from a 1xEV-DO mode to a 1X mode, if call drop occurs while multimedia data are being transmitted from a 1xEV-DO system to the hybrid access terminal so that the hybrid access terminal is connected to the 1X system based on voice signals transmitted from the 1X system.

According to an aspect of the present invention, there is provided a system for recognizing a call switch-over to a CDMA 2000 1X system (1X system) when a call drop of a hybrid access terminal with respect to a CDMA 2000 1xEV-DO system (1xEV-DO system) occurs, the system comprising: the hybrid access terminal operated in a 1X mode in relation to a 1X system for receiving a voice signal transmission service or a low-rate data transmission service from the 1X system and in a 1xEV-DO mode in relation to the 1xEV-DO system for receiving a high-rate data transmission service from the 1xEV-DO system, the hybrid access terminal in traffic with the 1xEV-DO system being switched into the 1X mode to perform a call connection with the 1X system and to transmit/receive voice and/or data to/from the 1X system when voice signals or low-rate data are received from the 1X system; a 1X transceiver for transmitting/receiving voice signals and/or data to/from the hybrid access terminal; a 1X controller for controlling a transmission service of the 1X transceiver; a mobile switching center for providing a communication access path of the 1X system with respect to a communication call transmitted from the hybrid access terminal, storing information of the hybrid access terminal registered in the mobile switching center in a home location register (HLR), and storing information of hybrid access terminals located in a region of the mobile switching center; a 1xEV-DO access network transceiver subsystem for transmitting/receiving high-rate data to/from the hybrid access terminal; and a 1xEV-DO access network controller for controlling a high-rate data transmission service of the 1xEV-DO access network transceiver subsystem, transmitting a message inquiring whether or not voice signals or low-rate data are received in the hybrid access terminal to the mobile switching center when a signal having a level below a predetermined level is received from the hybrid access terminal if a call drop occurs between the 1xEV-DO system and the hybrid access terminal in traffic with the 1xEV-DO system, and recognizing that the hybrid access terminal is switched into the 1X mode when a message capable of checking whether or not the voice signals or low-rate data are received in the hybrid access terminal is received from the mobile switching center.

According to an aspect of the present invention, there is provided a method for recognizing a call switch-over from a CDMA 2000 1xEV-DO system (1xEV-DO system) to a CDMA 2000 1X system (1X system) when a hybrid access terminal is switched from a 1xEV-DO mode to a 1X mode, the method comprising the steps of: (a) sequentially initializing the 1X mode and the 1xEV-DO mode of the hybrid access terminal such that the hybrid access terminal stays in an idle state; (b) performing dual monitoring with respect to the 1X mode and the 1xEV-DO mode by using the hybrid access terminal in a state that the hybrid access terminal stays in the idle state; (c) allowing the hybrid access terminal to make a call-connection with the 1xEV-DO system in the 1xEV-DO mode and enter a traffic state, thereby enabling the hybrid access terminal to transmit/receive high-rate data; (d) occurring a call drop between the hybrid access terminal and the 1xEV-DO system; (e) making a call-connection with the 1X system when the hybrid access terminal is switched from the 1xEV-DO mode to the 1X mode; (f) transmitting a message inquiring whether or not voice signals or low-rate data are received in the hybrid access terminal to a mobile switching center; and (g) receiving a message capable of checking whether or not the voice signals or low-rate data are received in the hybrid access terminal from the mobile switching center and recognizing that the hybrid access terminal has been switched from the 1xEV-DO mode to the 1X mode.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Reference will now be made in detail to the preferred embodiments of the present invention. The same reference numerals are used to designate the same elements as those shown in other drawings. In the following description of the present invention, a detailed description of known configurations and functions incorporated herein will be omitted when it may make the subject matter of the present invention rather unclear.

Figure 1:
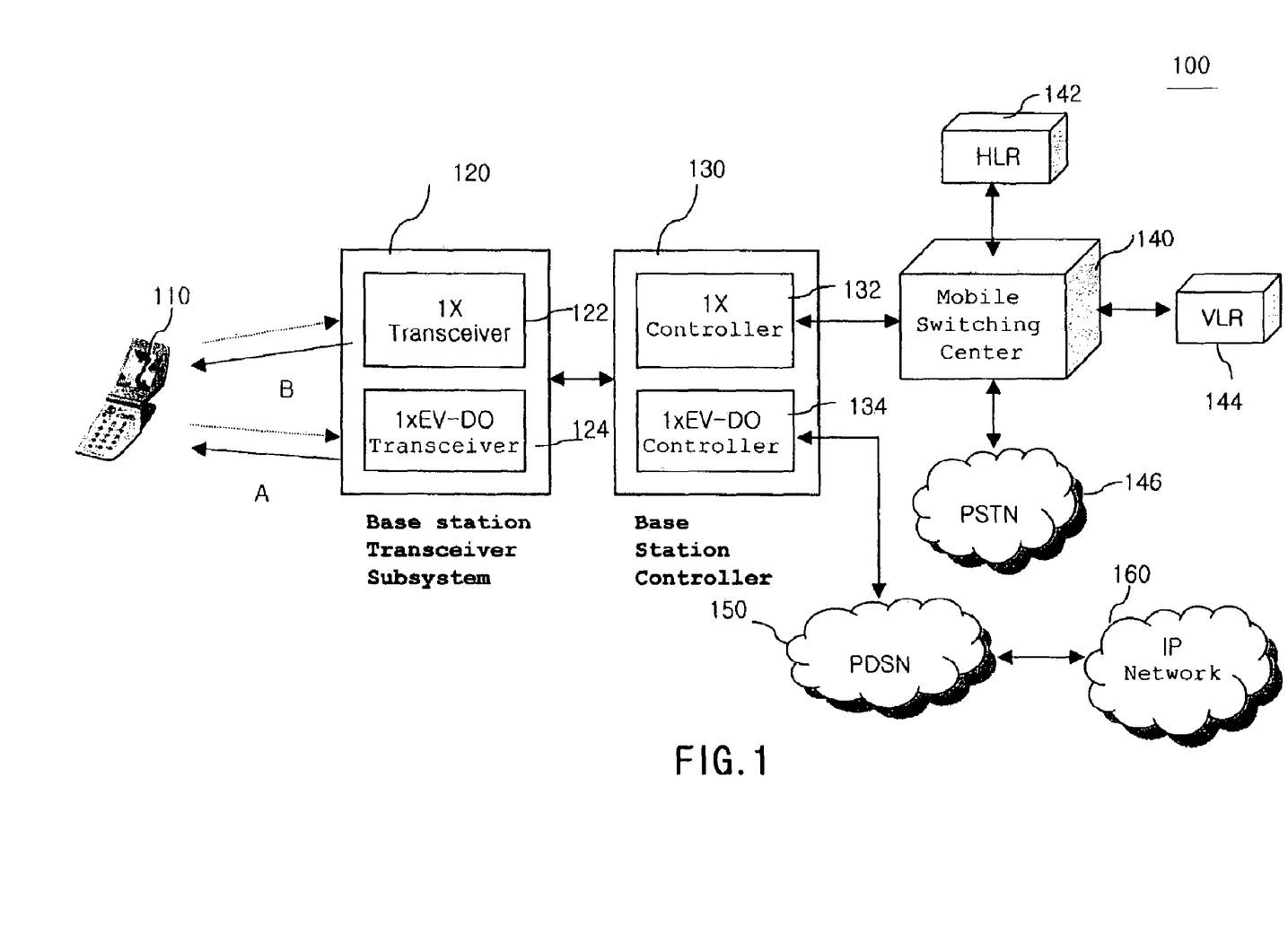
FIG. 1 is a block diagram schematically showing a system for recognizing a call shift-over from a 1xEV-DO mode to a 1X mode according to an embodiment of the present invention.

FIG. 1 is a block diagram schematically showing a system for recognizing a call shift-over from a 1xEV-DO mode when a hybrid access terminal is switched into a 1X mode due to the communication disruption with a 1xEV-DO system according to an embodiment of the present invention.

As shown in FIG. 1, the system 100 of the present invention includes both 1xEV-DO system and 1X system. The system 100 has a construction for receiving a voice transmission service or a low-rate data transmission service according to a 1X method, which includes a hybrid access terminal 110, a 1X transceiver 122, a 1X controller 132, and a mobile switching center (MSC) 140. In addition, the system 100 has a construction for receiving a high-rate data transmission service according to a 1xEV-DO method, which includes a hybrid access terminal 110, a 1xEV-DO access network transceiver subsystem (ANTS) 124, a 1xEV-DO access network controller (ANC) 134, a packet data serving node (hereinafter, simply referred to as PDSN) 150, and an IP (internet protocol) network.

The hybrid access terminal 110 has hardware structures, which correspond to the two systems and operate separately from each other, so that the hybrid access terminal 110 can receive voice signal transmission service and low speed data transmission service through 1X system and receive high-rate data service through the 1xEV-DO system. The hybrid access terminal 110 having such complicated functions and constructions is switched into a 1X mode when the hybrid access terminal 110 is in a general idle state in such a manner that the hybrid access terminal 110 can make communication with the 1X system. In this state, the hybrid access terminal 110 is periodically switched into a 1xEV-DO mode in a predetermined period of time so as to check whether or not data are received through the 1xEV-DO system and returns to the 1X mode.

The switching functions operating between the 1X system and the 1xEV-DO system are controlled by means of software stored in a mobile station modem (MSM) chip, which is a kind of a baseband modem chip accommodated in the hybrid access terminal 110. In addition, the switching functions are achieved by tracking frequencies of each network using a searcher connected to the MSM chip. That is, when the hybrid access terminal 110 is switched from the 1xEV-DO mode into the 1X mode, a searcher module tracks the frequency of the 1X system under the control of the MSM chip. In addition, when the hybrid access terminal 110 is switched from the 1X mode to the 1xEV-DO mode, the searcher module tracks the frequency of the 1xEV-DO system.

In a case of a forward link for transmitting high-rate data from the 1xEV-DO system to the hybrid access terminal 110, channels divided through a CDMA (code division multiple access) method may transmit data through time slots, which are divided through a TDM (time division multiplexing) method such that a great amount of data can be transmitted. In contrast, in a case of a reverse link for transmitting data from the hybrid access terminal 110 to the 1xEV-DO access network transceiver subsystem 124 and the 1xEV-DO access network controller 134, data are transmitted through a conventional CDMA method for a plurality of subscribers.

In addition, the hybrid access terminal 110 receiving high-rate data from the 1xEV-DO system is switched into the 1X mode in a predetermined period of time so as to check whether or not voice signals or low-rate data are received through the 1X system and returns to the 1xEV-DO mode.

The 1X transceiver 122 and the 1xEV-DO access network transceiver subsystem 124 form a base station transceiver subsystem (BTS) 120 so as to provide mobile communication services including voice signals, low-rate data and multimedia data to the hybrid access terminal 110 through an air interface. For instance, the 1X transceiver 122 provides the voice signals or the low-rate data to the hybrid access terminal 110, and the 1xEV-DO transceiver subsystem 124 generally provides high-rate data to the hybrid access terminal 110.

The 1X controller 132 and the 1xEV-DO access network controller 134 form a base station controller (BSC) 130 for controlling the mobile communication services of the base station transceiver subsystem 120. That is, the 1X controller 132 connects a plurality of 1X transceivers to the mobile switching center 140 for transmission control of voice signals or data. The 1xEV-DO controller 134 connects a plurality of 1xEV-DO transceivers to the PSDN 150, which is a packet data network, for transmission control of data.

Also, the 1xEV-DO controller 134 in traffic with the hybrid access terminal 110 calculates a predetermined period of time when a call drop occurs due to release of a session and a connection in relation to the hybrid access terminal 110 while a multimedia service is being provided to the hybrid access terminal 110. This is required for ensuring the hybrid access terminal to have a sufficient time to return to a call connection state, because the call drop may temporarily happen due to inferior wave environmental conditions or when the hybrid access terminal is located in a wave shadow zone.

Next, while calculating the predetermined time, when a signal received from the hybrid access terminal 110 is smaller than a predetermined level, or when a signal is not received from the hybrid access terminal 110, the 1xEV-DO controller 134 transmits a message inquiring whether or not voice signals are received in the hybrid access terminal 110, which includes a mobile identification number (hereinafter, referred to as an MIN) and an electrical serial number (hereinafter, referred to as an ESN) information of the hybrid access terminal 110, to the mobile switching center 140. Then, when a message capable of checking whether or not voice signals are received in the hybrid access terminal 110 is received from the mobile switching center 140, the 1xEV-DO controller 134 recognizes that the call connection of the hybrid access terminal 110 is switched into the 1X mode.

The mobile switching center 140 physically connects a plurality of 1X controllers 132 to another mobile switching center or to a public switched telephone network (PSTN) 146 so as to provide a communication access path of the 1X system with respect to a communication call transmitted from the hybrid access terminal 110.

In addition, the mobile switching center 140 processes call signals of the hybrid access terminal 110 by obtaining profile information of the hybrid access terminal 110 from a home location register (hereinafter, simply referred to as "HLR") 132, which is a database storing information of hybrid access terminals registered in the mobile switching center 140, and a visitor location register (hereinafter, simply referred to as "VLR") 134, which is a database storing information of hybrid access terminals 110 located in a region of the mobile switching center 140. Herein, profile information includes an MIN, an ESN, and supplementary services.

The 1xEV-DO system, which is a packet data system for transmitting only data, is connected to the PSDN 150 based on TCP/IP so as to transmit/receive various data in the form of an IP packet to/from an IP network 160. In addition, the 1xEV-DO system receives packet data, which are to be transmitted to the hybrid access terminal 110, from the IP network 160, generates packet data (e.g., MPEG packet data) for a packet data service according to the received packet data. Then, the 1xEV-DO system transmits the generated packet data to the hybrid access terminal 110 through time slots, which are divided through a TDM method. In addition, the 1xEV-DO system receives CDMA data, which are modulated through a CDMA method, from the hybrid access terminal 110, generates packet data by using the CDMA data, and transmits the packet data to the PDSN 150.

In a case of a forward link, the 1xEV-DO system transmits data with maximum power thereof without using a power control of a base station while providing a hard handoff function. However, in a case of a reverse link, the power control is carried out in each terminal while providing a softer or a soft handoff function.

In addition, according to the present invention, when the hybrid access terminal 110 operated in traffic with the 1xEV-DO system is periodically switched into the 1X mode so as to receive a voice signal. When receiving the voice signal from the 1X system, the hybrid access terminal 110 is switched into the 1X mode to make a call-connection with the 1X system, thereby performing voice communication. The mobile switching center 140 recognizes that the hybrid access terminal 110 makes a call-connection with the 1X system.

When the hybrid access terminal 110 is switched into the 1X mode for the voice communication, a signal of a DRC channel having a level below a predetermined level is received in the 1xEV-DO system for a predetermined period of time. Then, a call drop occurs. The 1xEV-DO system transmits a message inquiring whether or not voice signals are received in the hybrid access terminal 110 to the mobile switching center 140. Then, when receiving a response message for the message, the 1xEV-DO system recognizes that the call drop of the hybrid access terminal 110 is resulted because the voice signal is transmitted from the 1X system.

Figure 2A:
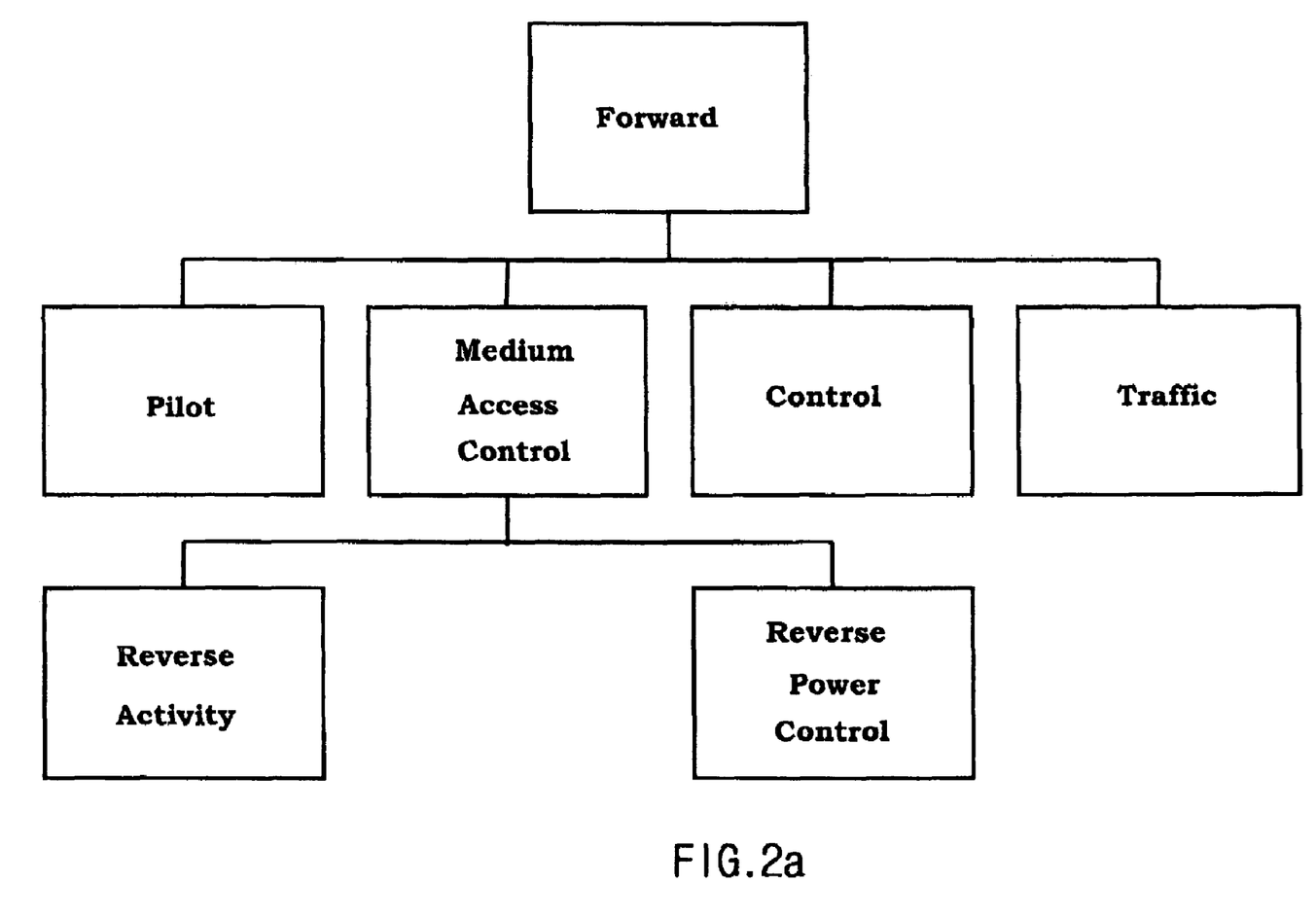
FIG. 2a is a block view showing a channel structure of a forward link for transmitting data to a hybrid access terminal through a 1xEV-DO system.

FIG. 2*a* is a block view showing a channel structure of a forward link for transmitting data to the hybrid access terminal 110 through the 1xEV-DO system.

As shown in FIG. 2*a*, the forward link includes a pilot channel, a medium access control (MAC) channel, a control channel, and a traffic channel. The pilot channel is provided to transmit a pilot signal for allowing the 1xEV-DO system to track the hybrid access terminal 110. The hybrid access terminal 110 receives at least one pilot signal through the pilot channel and accesses to a wireless base station, which has transmitted a pilot signal having greatest intensity. In addition, the pilot channel is used as a reference for coherent detection of the wireless base station having the 1xEV-DO system by means of the hybrid access terminal 110.

The MAC channel is mainly used for controlling the reverse link and includes a reverse activity (RA) channel and a reverse power control (RPC) channel. Herein, the RA channel is used for determining a transmission rate of the reverse link. In addition, the RA channel may be used for requesting the hybrid access terminal 110 to decrease the transmission rate when channels of the reverse link are saturated. In addition, the RPC channel is used for controlling transmission power when the hybrid access terminal 110 transmits signals or data through the reverse link.

The control channel is used for transmitting a broadcast message from the 1xEV-DO system to the hybrid access terminal 110 or for transmitting a direct message in order to directly control a specific hybrid access terminal. The traffic channel is used when the 1xEV-DO system transmits only packet data to the hybrid access terminal 110.

Figure 2B:
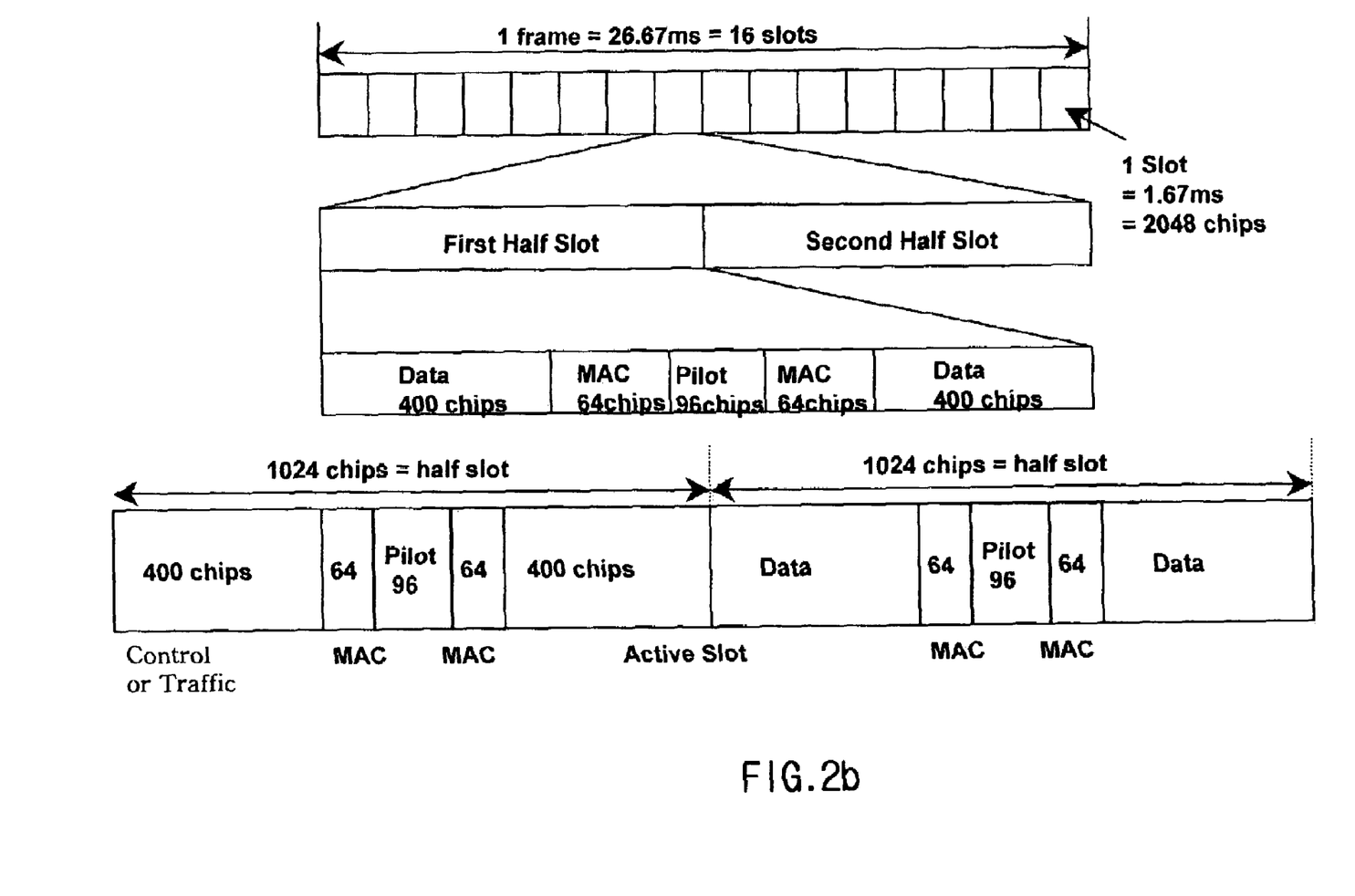
FIG. 2b is a block view showing a time slot structure and a data structure of a forward link for transmitting data to a hybrid access terminal through a 1xEV-DO system.

Hereinafter, a time slot structure and a data structure in the forward link will be described with reference to FIG. 2*b*. Firstly, the forward link includes 16 time slots per one frame having a time interval about 26.67 ms. In addition, each of the time slots includes a first half slot having 1024 chips and a second half slot having 1024 chips, that is, the time slot has total 2048 chips. In addition, a time interval of 1.67 ms is allotted to each time slot.

In detail, each of the first half slot and second half slot includes 400 data slot chips, 64 MAC slot chips, 96 pilot slot chips, 64 MAC slot chips and 400 data slot chips.

Figure 3:
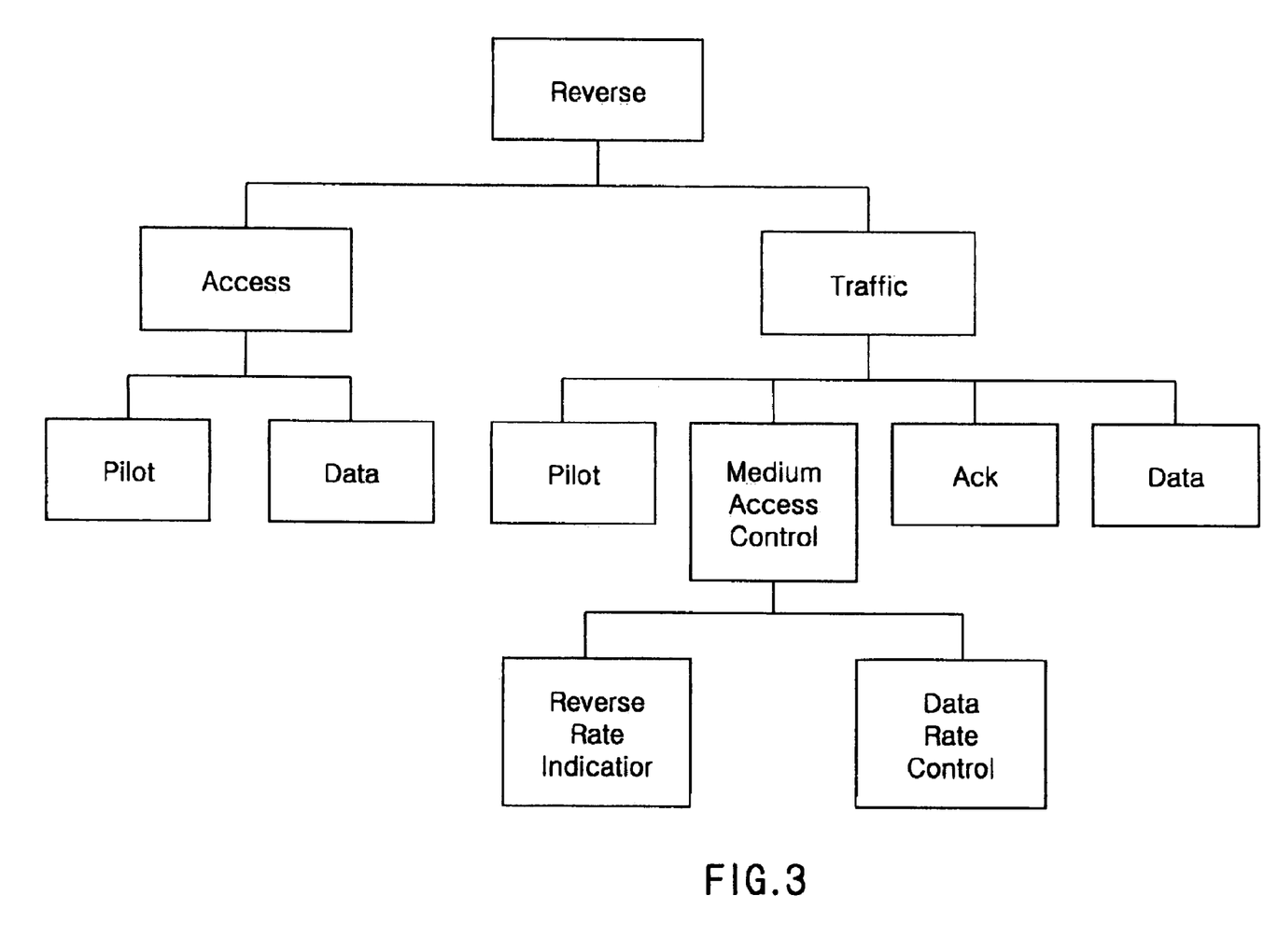
FIG. 3 is a block view showing a channel structure of a reverse link for transmitting data to a 1xEV-DO system from a hybrid access terminal.

FIG. 3 is a block view showing a channel structure of the reverse link for transmitting data to the 1xEV-DO system from the hybrid access terminal 110.

The reverse link shown in FIG. 3 may use a CDMA method in the same manner as the 1X system and mainly include an access channel and a traffic channel. The access channel has a pilot channel and a data channel and the traffic channel has a pilot channel, a MAC channel, an Ack channel, and a data channel. Herein, the MAC channel is again divided into a reverse rate indicator (RRI) channel and a data rate control (DRC) channel.

The access channel is used for transmitting an origination connection_request message, and a registration route_update message. The access channel has a low transmission rate of 9.6 kbps for stability of a wireless channel.

Similar to the pilot channel in the forward link shown in FIG. 2*a*, the pilot channel shown in FIG. 3 is used as a reference for coherent detection of the wireless base station having the 1xEV-DO system by means of the hybrid access terminal 110. The data channel is used for transmitting data required for the hybrid access terminal 110 to access to the 1xEV-DO system.

The traffic channel is used when the hybrid access terminal 110 transmits packet data to the 1xEV-DO system. The traffic channel provides various data transmission rates depending on the wireless communication environment.

The pilot channel performs a function identical to the function of the pilot channel, which has been described with reference to the access channel. The MAC channel is used for controlling a data transmission rate of the traffic channel, so the MAC channel continuously exists while the hybrid access terminal 110 is being connected to the 1xEV-DO system. The RRI channel of the MAC channel is used for representing information of the data transmission rate of the traffic channel when the hybrid access terminal 110 transmits data through the traffic channel. An RRI value is displayed in the hybrid access terminal 110.

In addition, the DRC channel determines a data rate, which can be demodulated, depending on the channel environment of the forward link and notifies the base station of the data rate. That is, the 1xEV-DO access network transceiver subsystem 124 transmits packet data to the hybrid access terminal 110 by using time slots of the forward link. At this time, a basis for determining the transmission rate of packet data is the DRC cover value transmitted by the hybrid access terminal 110. In order to determine the DRC cover value, the hybrid access terminal 110 measures a C/I (carrier to interference) value transmitted from the 1xEV-DO access network transceiver subsystem 124 and determines the DCR cover value for the maximum transmission rate.

Figure 4A:
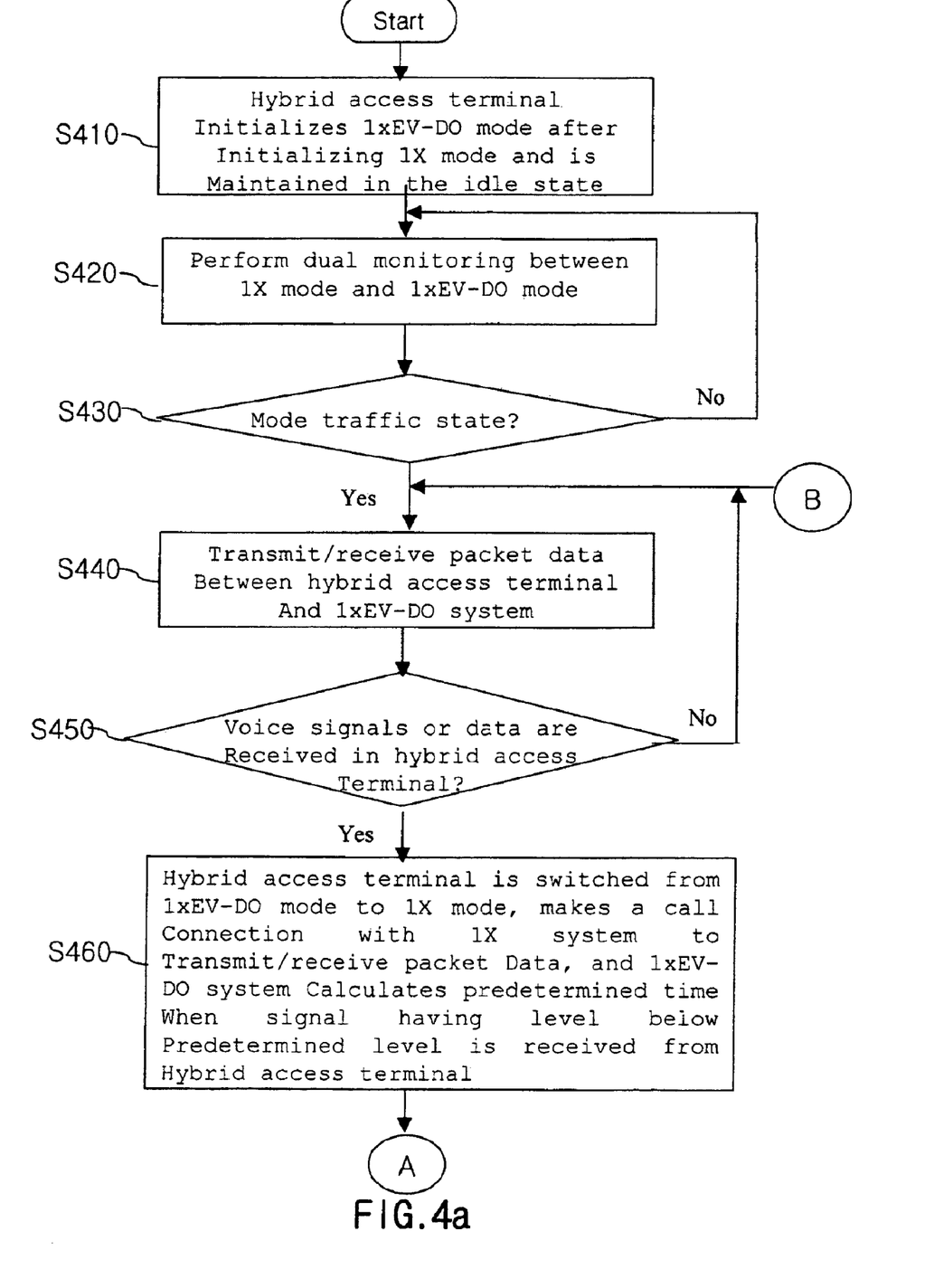
FIGS. 4a and 4b are flowcharts showing a procedure of recognizing a call shift-over from a 1xEV-DO mode to a 1X mode according to an embodiment of the present invention.
Figure 4B:
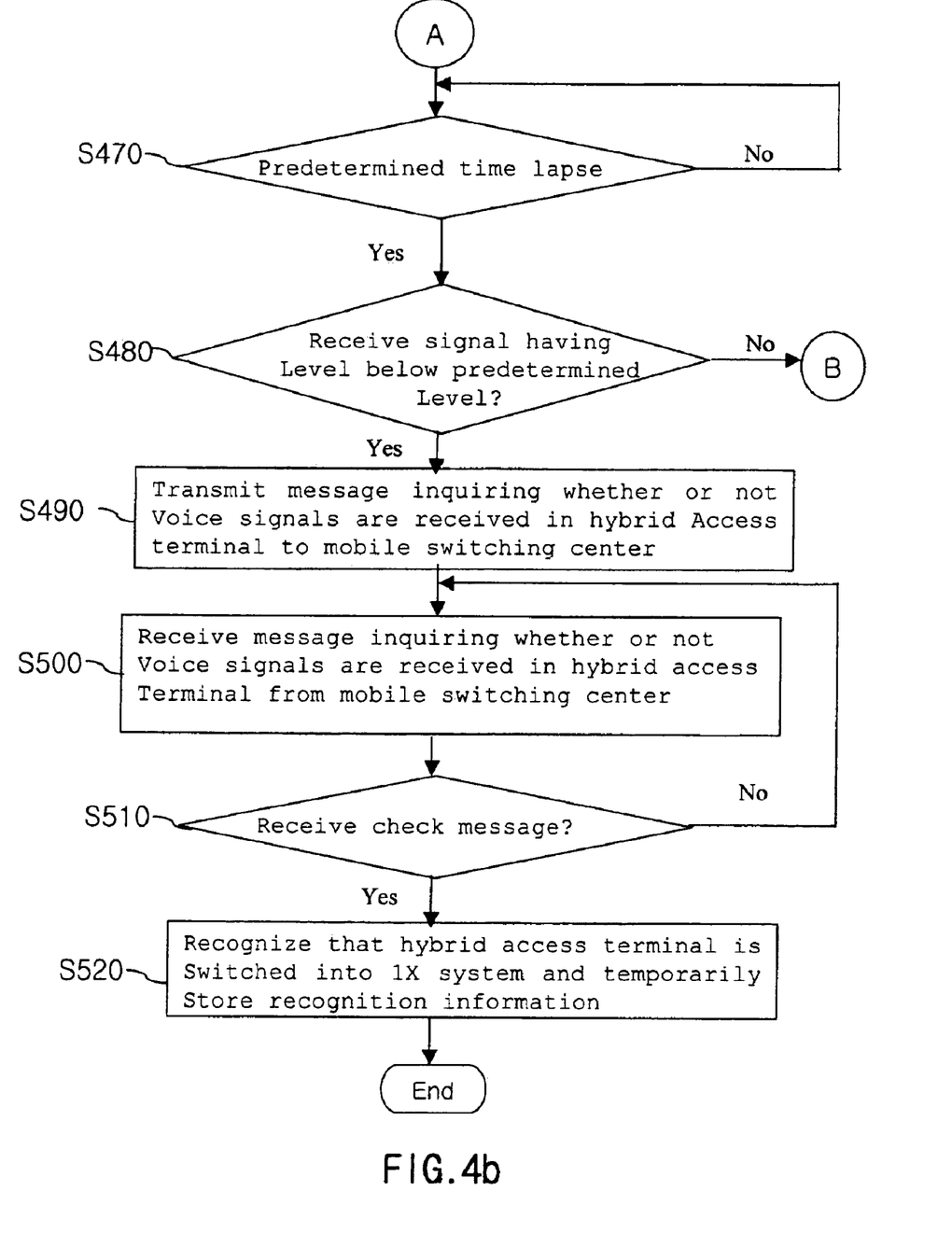

FIGS. 4*a* and 4*b* are flowcharts showing a procedure by which the 1xEV-DO system recognizes that the hybrid access terminal 110 is switched into a 1X mode according to an embodiment of the present invention.

When the hybrid access terminal 110 is powered on by a user, the hybrid access terminal 110 receives the pilot signals from the 1X controller 132 and the 1X transceiver 122 of the 1X system so that the 1X mode is initialized and the hybrid access terminal 110 is maintained in an idle state. In addition, the hybrid access terminal 110 initializes the 1xEV-DO mode by using a system parameter message obtained when initializing the 1X mode, and the pilot signals transmitted from the 1xEV-DO access network controller 134 and the 1xEV-DO access network transceiver subsystem 124, and then, the hybrid access terminal 110 is maintained in the idle state (S410).

In the idle state, the hybrid access terminal 110 basically set an operation of the terminal as the 1X mode and waits for communication.

After initializing the 1X mode and the 1xEV-DO mode, the hybrid access terminal 110 performs a dual monitoring between the 1X mode and the 1xEV-DO mode (S420) in the 1X mode. In the 1X mode, the hybrid access terminal 110 monitors the 1xEV-DO mode over a period of 5.12 seconds. Herein, in the dual monitoring, the hybrid access terminal 110 in the 1X mode basically watches whether or not signals or data are received from the 1X transceiver 122. After 5.12 seconds, the hybrid access terminal 110 switches its operation mode into the 1xEV-DO mode so as to watch whether or not data are transmitted from the 1xEV-DO access network transceiver subsystem 124, and then returns to the 1X mode.

Further, when a user requests data transmission from the 1xEV-DO access network transceiver subsystem 124 while the hybrid access terminal 110 monitors the 1X system and the 1xEV-DO system in the idle state, the hybrid access terminal 110 determines whether to enter a traffic state for activating the 1xEV-DO mode and transmitting/receiving data (S430).

In order to enter the traffic state of the 1xEV-DO mode, the hybrid access terminal 110 must set a connection and a session in relation to the 1xEV-DO access network transceiver subsystem 124 so as to transmit/receive data to/from the 1xEV-DO access network transceiver subsystem 124. Herein, the connection represents a logical communication path set between a terminal and a system for transmission of information, and the session represents a period until communication ends after recognizing each other through a message exchange in order to perform communication between the terminal and the system.

Accordingly, in order to receive data from the 1xEV-DO access network transceiver subsystem 124, the hybrid access terminal 110 transmits a connection request message for forming a connection to the 1xEV-DO access network transceiver subsystem 124 so as to request a call connection. In response to the request, the 1xEV-DO access network transceiver subsystem 124 sets the connection and the session in relation to the hybrid access terminal 110 so as to perform the call connection. After the call connection is performed between the hybrid access terminal 110 and the 1xEV-DO access network transceiver subsystem 124, the hybrid access terminal 110 enters the traffic state for transmitting/receiving data.

In step 430, when entering the traffic state of the 1xEV-DO mode, the hybrid access terminal 110 transmits/receives packet data to/from the 1xEV-DO system (S440).

Meanwhile, when a user of the hybrid access terminal 110 moves into a shadow zone or a blanket area while the packet data is being transmitted between the 1xEV-DO system and the hybrid access terminal 110 in traffic with the 1xEV-DO system, the connection and the session formed between the hybrid access terminal 110 and the 1xEV-DO access network transceiver subsystem 124 are released due to interference and disruption. Therefore, an interruption to communication occurs.

When the hybrid access terminal 110 receives voice signals or data from the 1X system (S450), the hybrid access terminal 110 is switched from the 1xEV-DO mode to the 1X mode. In this state, the hybrid access terminal 110 transmits a message requesting a call connection to the 1X transceiver 122 in wireless manner so as to perform the call connection with respect to the 1X system. Then, the hybrid access terminal 110 transmits/receives voice signals and data to/from the 1X transceiver 122.

When the call connection is performed between the hybrid access terminal 110 and the 1X system, the mobile switching center 140 stores information of the hybrid access terminal 110, which is located in a region of the mobile switching center 140, in the VLR 144, and processes call signals of the hybrid access terminal 110 according to profile information of the hybrid access terminal 110 stored in the VLR 144.

Meanwhile, when the hybrid access terminal 110 performs the call connection with the 1X system while transmitting/receiving the packet data to/from the 1xEV-DO system, intensity of signals communicated between the hybrid access terminal 110 and the 1xEV-DO system is rapidly lowered, or a call drop occurs.

Accordingly, when a signal having a level below a predetermined level is received from the hybrid access terminal 110 through the DRC channel, the 1xEV-DO access network controller 134 calculates a predetermined time (can be adjusted by a parameter), for instance, 6 seconds (S460), in order to secure a time required for recovering the call connection when a call drop temporarily occurs or a call drop occurs due to interference or interception after the hybrid access terminal 110 moves into the shadow zone or the blanket area.

When a predetermined time, for example 6 seconds, lapses (S470), the 1xEV-DO access network controller 134 judges whether or not a signal having a level below a predetermined level is received from the hybrid access terminal 110 (S480). Herein, if the hybrid access terminal 110 has been in a state in which the call drop temporarily occurs, a call connection is performed again. Therefore, signals having a level above a predetermined level, that is, packet data having a normal level are transmitted between the hybrid access terminal 110 and the 1xEV-DO system.

However, when the signal having the level below the predetermined level is received from the hybrid access terminal 110 or the hybrid access terminal 110 is maintained in the call drop state even if the predetermined time lapses (S480), the 1xEV-DO access network controller 134 transmits a message inquiring whether or not voice signals or low-rate data are received in the hybrid access terminal 110, together with the MIN and ESN information of the hybrid access terminal 110, to the mobile switching center 140 (S490).

Since the call connection is being performed between the hybrid access terminal 110 and the 1X system, the mobile switching center 140 checks the message transmitted from the 1xEV-DO access network controller 134. Further, the mobile switching center 140 transmits a message capable of checking whether or not voice signals or low-rate data are received in the hybrid access terminal 110 to the 1xEV-DO access network controller 134. Accordingly, the 1xEV-DO access network controller 134 receives the message capable of checking whether or not the voice signals are received in the hybrid access terminal 110 from the mobile switching center 140 (S510).

When the message capable of checking whether or not the voice signals or low-rate data are received in the hybrid access terminal 110 is received from the mobile switching center 140, the 1xEV-DO access network controller 134 checks the message and recognizes that the hybrid access terminal 110 is switched into the 1X mode based on the voice signals or low-rate data transmitted from the 1X system. Otherwise, the 1xEV-DO access network controller 134 judges that the call drop occurs due to inferior wireless communication environment. Herein, when systems, such as the 1xEV-DO access network transceiver subsystem 124 and the 1xEV-DO access network controller 134, are malfunctioned, the 1xEV-DO system itself can recognize the malfunction of the systems, so the 1xEV-DO system can determine that the call drop occurs due to the inferior wireless communication environment, except that the voice signals or low-rate data are received in the hybrid access terminal 110.

The 1xEV-DO access network controller 134 temporarily stores recognition information for the call drop in a predetermined storage area (S520). Then, the 1xEV-DO access network controller 134 refers to the information when stopping a multimedia data transmission service to be provided to the hybrid access terminal 110, or making communication with the hybrid access terminal 110.

According to an embodiment of the present invention, when a call drop occurs while a multimedia data transmission service is being provided from 1xEV-DO system to a hybrid access terminal, the 1xEV-DO system can recognize that the hybrid access terminal is automatically switched into a 1X mode based on voice signals or data transmitted from a 1X system, by asking the 1X system about the switch of the hybrid access terminal and receiving an response thereof.

As can be seen from the foregoing, the prior art has a problem in that a 1xEV-DO system cannot recognize that a hybrid access terminal is switched into a 1X mode to continuously perform voice communication when a call drop occurs while data are being transmitted between the 1xEV-DO system and the hybrid access terminal. According to the present invention, the 1xEV-DO system can recognize in real time that the hybrid access terminal is switched into a 1X mode for the voice communication.

Accordingly, a method for recognizing a call switch-over according to the present invention enables the 1xEV-DO system to recognize that the hybrid access terminal is switched into the 1X mode when a call drop occurs while a multimedia service is being provided to the hybrid access terminal. Therefore, when the call drop occurs, the present invention can allow a user to find a precise reason of the call drop, even if the call drop may happen in various situations, such as when the hybrid access terminal is shifted into a wave shadow zone, when the 1xEV-DO system malfunctions, or when the hybrid access terminal is switched into the 1X mode for voice communication. Further, according to the present invention, it is possible to stop a data transmission service from the 1xEV-DO system to the hybrid access terminal when the call drop occurs. Therefore, overload of the 1xEV-DO system and waste of communication resources can be prevented.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. A system for recognizing a call switch-over to a CDMA 2000 1X system (1X system) when a call drop of a hybrid access terminal with respect to a CDMA 2000 1xEV-DO system (1xEV-DO system) occurs, the system comprising:
    the hybrid access terminal operated in a 1X mode in relation to a 1X system for receiving a voice signal transmission service or a low-rate data transmission service from the 1X system and in a 1xEV-DO mode in relation to the 1xEV-DO system for receiving a high-rate data transmission service from the 1xEV-DO system, the hybrid access terminal in traffic with the 1xEV-DO system being switched into the 1X mode to perform a call connection with the 1X system and to transmit/receive voice and/or data to/from the 1X system when voice signals or low-rate data are received from the 1X system;
    a 1X transceiver for transmitting/receiving voice signals and/or low-rate data to/from the hybrid access terminal;
    a 1X controller for controlling a transmission service of the 1X transceiver;
    a 1X mobile switching center for providing a communication access path of the 1X system for voice signals and/or low-rate data to/from the hybrid access terminal, storing information of the hybrid access terminal registered in the 1X mobile switching center in a home location register (HLR), and storing information of hybrid access terminals located in a region of the 1X mobile switching center;
    a 1xEV-DO access network transceiver subsystem for transmitting/receiving high-rate data to/from the hybrid access terminal; and
    a 1xEV-DO access network controller for
        controlling a high-rate data transmission service of the 1xEV-DO access network transceiver subsystem,
        detecting a call drop between the 1xEV-DO system and the hybrid access terminal in traffic with the 1xEV-DO system, and
        when the call drop is detected
            transmitting a message to the 1X mobile switching center to inquire whether or not voice signals or low-rate data are received in the hybrid access terminal,
            recognizing that the hybrid access terminal is switched into the 1X mode when a message confirming that voice signals or low-rate data are received in the hybrid access terminal is received from the 1X mobile switching center, and
            storing the recognition information so that a user knows the reason for the call drop.

2. The system according to claim 1, wherein the hybrid access terminal receiving data in traffic with the 1xEV-DO system is periodically switched into the 1X mode in a predetermined period of time so as to check whether or not voice signals are received though the 1X system and returns to the 1xEV-DO mode.

3. The system according to claim 1, wherein the hybrid access terminal is set to the 1X mode in an idle state thereof in order to make communication with the 1X system and is periodically switched into the 1xEV-DO mode in a predetermined period of time so as to check whether or not data are received though the 1xEV-DO system and returns to the 1X mode.

4. The system according to claim 1, wherein the 1xEV-DO access network controller transmits a message inquiring whether or not voice signals are received in the hybrid access terminal to the 1X mobile switching center together with MIN (mobile identification number) and ESN (electrical serial number) information regarding the hybrid access terminal.

5. The system according to claim 1, wherein the hybrid access terminal is switched from the 1xEV-DO mode into the 1X mode by tracking frequency of the 1X system using a searcher module under the control of a mobile station modem (MSM) chip.

6. The system according to claim 1, wherein a TDMA (time division multiple access) method is utilized in a case of a forward link transmitting data from the 1xEV-DO system to the hybrid access terminal, and a CDMA (code division multiple access) method is utilized in a case of a reverse link transmitting data from the hybrid access terminal to the 1xEV-DO system.

7. The system according to claim 6, wherein a hard handoff is carried out in case of the forward link, which transmits data from the 1xEV-DO system to the hybrid access terminal, by transmitting data with maximum power without performing power control, and a soft handoff is carried out in case of the reverse link while performing the power control with respect to each hybrid access terminal.

8. The system according to claim 7, wherein the forward link includes:
    a pilot channel used for transmitting a pilot signal allowing the 1xEV-DO system to track the hybrid access terminal;
    a MAC (medium access control) channel used for controlling the reverse link;
    a control channel used for transmitting a broadcast message or a direct message for directly controlling a specific hybrid access terminal from the 1xEV-DO system to the hybrid access terminal; and
    a traffic channel used for transmitting only packet data from the 1xEV-DO system to the hybrid access terminal.

9. The system according to claim 8, wherein the pilot channel is used as a reference for coherent detection of a wireless base station having the 1xEV-DO system by means of the hybrid access terminal.

10. The system according to claim 8, wherein the hybrid access terminal receives at least one pilot signal through the pilot channel and accesses to a wireless base station, which has transmitted a pilot signal having greatest intensity.

11. The system according to claim 1, wherein the 1xEV-DO access network controller transmitting/receiving the high-rate data to/from the hybrid access terminal calculates a predetermined time when a call drop of the hybrid access terminal occurs, and determines whether or not a signal having a level below a predetermined level is received from the hybrid access terminal when the predetermined time lapses.

12. A method for recognizing a call switch-over from a CDMA 2000 1xEV-DO system (1xEV-DO system) to a CDMA 2000 1X system (1X system) when a hybrid access terminal is switched from a 1xEV-DO mode to a 1X mode,
wherein the 1X system comprises:
a base station comprising
a 1X transceiver for transmitting/receiving voice signals and/or low-rate data to/from the hybrid access terminal:
a 1X controller for controlling the 1X transceiver; and
a 1X mobile switching center for providing a communication access path of the 1X system for voice signals and/or low-rate data to/from the hybrid access terminal, storing information of the hybrid access terminal registered in the 1X mobile switching center in a home location register (HLR), and storing information of hybrid access terminals located in a region of the 1X mobile switching center;
wherein the 1xEV-DO system comprises, in said base station;
a 1xEV-DO access network transceiver subsystem for transmitting/receiving high-rate data to/from the hybrid access terminal; and
a 1xEV-DO access network controller for controlling the 1X transceiver;
the method comprising the steps of:
allowing the hybrid access terminal to make a call-connection with the 1xEV-DO system in the 1xEV-DO mode and enter a 1xEV-DO traffic state, thereby enabling the hybrid access terminal to transmit/receive high-rate data;
performing the call switch-over by switching the hybrid access terminal from the 1xEV-DO mode to the 1X mode in response to voice signals and/or low-rate data received from the 1X system at the hybrid access terminal while the hybrid access terminal is being in the 1xEV-DO traffic state;
detecting, by the 1xEV-DO access network controller, a call drop between the hybrid access terminal and the 1xEV-DO system as a result of said switching the hybrid access terminal from the 1xEV-DO mode to the 1X mode;
when the call drop is detected by the 1xEV-DO access network controller, transmitting, by the 1xEV-DO access network controller, a first message to the 1X mobile switching center to inquire whether or not voice signals or low-rate data are received in the hybrid access terminal;
in response to the first message received at the 1X mobile switching center, sending, by the 1X mobile switching center, a second message to the 1xEV-DO access network controller to confirm that voice signals or low-rate data are received in the hybrid access terminal;
recognizing, by the 1xEV-DO access network controller and based on the second message received at the 1xEV-DO access network controller, that the hybrid access terminal has been switched from the 1xEV-DO mode to the 1X mode; and storing, by the 1xEV-DO access network controller, the recognition information so that a user knows the reason for the call drop.

13. The method as claimed in claim 12, further comprising, prior to said allowing:
sequentially initializing the 1X mode and the 1xEV-DO mode of the hybrid access terminal such that the hybrid access terminal stays in an idle state;
performing dual monitoring with respect to the 1X mode and the 1xEV-DO mode while the hybrid access terminal stays in the idle state;
wherein the hybrid access terminal initializes the 1xEV-DO mode by using system parameters obtained when initializing the 1X mode.

14. The method as claimed in claim 12, wherein the hybrid access terminal, while receiving data in traffic with the 1xEV-DO system, is periodically switched into the 1X mode in a predetermined period of time so as to check whether or not voice signals or low-rate data are received through the 1X system and then returns to the 1xEV-DO mode if no voice signals or low-rate data are received from the 1X system.

15. The method as claimed in claim 12, wherein the call switch-over from the 1xEV-DO mode into the 1X mode is performed by tracking a frequency of the 1X system using a searcher module under the control of a mobile station modem (MSM) chip accommodated in the hybrid access terminal.

16. The method as claimed in claim 12, wherein the 1xEV-DO access network controller transmits the first message together with MIN (mobile identification number) and ESN (electrical serial number) information regarding the hybrid access terminal to the 1X mobile switching center.

17. The method as claimed in claim 12, wherein the call-connection is performed after a connection and a session is set between the hybrid access terminal and the 1xEV-DO system.

18. The method as claimed in claim 13, wherein, in said initializing, the hybrid access terminal is set to the 1X mode in the idle state thereof in order to make communication with the 1X system and is periodically switched into the 1xEV-DO mode in a predetermined period of time so as to check whether or not high-rate data are received through the 1xEV-DO system, and returns to the 1X mode if no high-rate data are received from the 1xEV-DO system.

19. The method as claimed in claim 17, wherein the session is set by requesting a unicast access terminal identifier (UATI) to the 1xEV-DO system and being assigned the UATI from the 1xEV-DO system, the UATI is an identifier (ID) of the hybrid access terminal representing a number assigned from the 1xEV-DO system to the hybrid access terminal, and a parameter, which is to be used in a setup of high-rate data call, power control and handoff, is set when the session is set between the hybrid access terminal and the 1xEV-DO system.

20. The method as claimed in claim 12, wherein a TDMA (time division multiple access) method is utilized in a case of a forward link transmitting data from the 1xEV-DO system to the hybrid access terminal, and a CDMA (code division multiple access) method is utilized in a case of a reverse link transmitting data from the hybrid access terminal to the 1xEV-DO system.

21. The method as claimed in claim 20, wherein the forward link includes:
a pilot channel used for transmitting a pilot signal allowing the 1xEV-DO system to track the hybrid access terminal;
a MAC (medium access control) channel used for controlling the reverse link;
a control channel used for transmitting a broadcast message or a direct message for directly controlling a specific hybrid access terminal from the 1xEV-DO system to the hybrid access terminal; and a traffic channel used for transmitting only packet data from the 1xEV-DO system to the hybrid access terminal.

22. The method as claimed in claim 21, wherein the pilot channel is used as a reference for coherent detection of a wireless base station having the 1xEV-DO system by means of the hybrid access terminal.

23. The method as claimed in claim 21, wherein the hybrid access terminal receives at least one pilot signal through the pilot channel and accesses to a wireless base station, which has transmitted a pilot signal having greatest intensity.

24. The system according to claim 1, wherein the 1xEV-DO access network controller and the 1X mobile switching center are communicable with one another only during the inquiry whether or not voice signals or low-rate data are received in the hybrid access terminal, and not during normal voice signal or data transmission in the 1X mode or the 1xEV-DO mode.

25. The method according to claim 12, further comprising referring, by the 1xEV-DO access network controller, to the stored recognition information when stopping a multimedia data transmission service to be provided to the hybrid access terminal, or making communication with the hybrid access terminal.

26. The method according to claim 12, wherein the 1xEV-DO system and the 1X system are operated separately from each other, except only for the transmission of the first and second messages during the inquiry whether or not voice signals or low-rate data are received in the hybrid access terminal.

* * * * *